United States Patent
Alataas

(10) Patent No.: US 10,436,593 B2
(45) Date of Patent: Oct. 8, 2019

(54) AUGMENTED REALITY ASSISTANCE SYSTEM FOR THE VISUALLY IMPAIRED

(71) Applicant: Reem Jafar Alataas, Bridgeport, CT (US)

(72) Inventor: Reem Jafar Alataas, Bridgeport, CT (US)

( * ) Notice: Subject to any disclaimer, the term of this patent is extended or adjusted under 35 U.S.C. 154(b) by 0 days.

(21) Appl. No.: 15/345,635

(22) Filed: Nov. 8, 2016

(65) Prior Publication Data

US 2018/0128622 A1  May 10, 2018

(51) Int. Cl.
| | |
|---|---|
| *G01C 21/20* | (2006.01) |
| *G06F 3/16* | (2006.01) |
| *G01C 21/00* | (2006.01) |
| *A61H 3/06* | (2006.01) |
| *G01C 21/34* | (2006.01) |

(52) U.S. Cl.
CPC .............. *G01C 21/20* (2013.01); *A61H 3/06* (2013.01); *A61H 3/061* (2013.01); *G01C 21/005* (2013.01); *G01C 21/34* (2013.01); *G01C 21/3407* (2013.01); *G06F 3/167* (2013.01)

(58) Field of Classification Search
CPC .......... A61H 3/06; A61H 3/061; G01C 21/20; G01C 21/005; G01C 21/34; G01C 21/3407; G06F 3/167
See application file for complete search history.

(56) References Cited

U.S. PATENT DOCUMENTS

| | | | | |
|---|---|---|---|---|
| 9,355,547 | B2 * | 5/2016 | Stevens | G08B 21/02 |
| 9,508,009 | B2 * | 11/2016 | Wnuk | G06F 17/30247 |
| 9,836,890 | B2 * | 12/2017 | Jurgenson | G06T 19/006 |
| 9,843,678 | B2 * | 12/2017 | Maxwell | H04M 3/51 |
| 9,844,469 | B2 * | 12/2017 | Boncyk | A61F 9/08 |
| 2006/0098089 | A1 * | 5/2006 | Sofer | A61H 3/061 |
| | | | | 348/62 |
| 2006/0129308 | A1 | 6/2006 | Kates | |
| 2007/0024644 | A1 * | 2/2007 | Bailey | G06F 3/011 |
| | | | | 345/633 |
| 2007/0238074 | A1 * | 10/2007 | Espenlaub | G09B 21/006 |
| | | | | 434/112 |

(Continued)

OTHER PUBLICATIONS

S. Hill, "5 amazing gadgets that are helping the blind see" http://www.digitaltrends.com/mobile/blind-technologies/, Jun. 20, 2014, pp. 1-7.

*Primary Examiner* — Sze-Hon Kong

(74) *Attorney, Agent, or Firm* — Maier & Maier, PLLC

(57) ABSTRACT

An augmented reality assistance system can include a wearable augmented reality device. The augmented reality device can include an imaging device, a speaker, a microphone, and one or more sensors. The system can also include a server communicably coupled to the wearable augmented reality device. The server can include processing circuitry configured to receive location information via at least one of the wearable augmented reality device, the one or more sensors, and the microphone, determine amplified location information based on the location information, receive image data from the imaging device, perform a web crawl of the image data, determine a navigation recommendation based on the amplified location information and the web crawl of the image data, and output the amplified location information and the navigation recommendation via the speaker.

15 Claims, 6 Drawing Sheets

(56) References Cited

U.S. PATENT DOCUMENTS

| | | | |
|---|---|---|---|
| 2008/0167814 A1* | 7/2008 | Samarasekera | G01C 21/005 701/469 |
| 2008/0170118 A1* | 7/2008 | Albertson | A61H 3/061 348/46 |
| 2009/0122161 A1* | 5/2009 | Bolkhovitinov | A61H 3/061 348/234 |
| 2011/0216179 A1* | 9/2011 | Dialameh | G06F 17/30247 348/62 |
| 2012/0053826 A1* | 3/2012 | Slamka | G01C 21/165 701/301 |
| 2012/0062357 A1* | 3/2012 | Slamka | G01C 21/20 340/4.11 |
| 2012/0229647 A1* | 9/2012 | Calman | G08B 13/19615 348/158 |
| 2012/0243739 A1* | 9/2012 | Fukuchi | G06K 9/00671 382/103 |
| 2013/0131985 A1* | 5/2013 | Weiland | G01C 21/20 701/516 |
| 2013/0317944 A1* | 11/2013 | Huang | G01S 5/0252 705/26.61 |
| 2013/0335301 A1* | 12/2013 | Wong | G02B 27/0093 345/8 |
| 2014/0180582 A1 | 6/2014 | Pontarelli et al. | |
| 2014/0218493 A1 | 8/2014 | Dialameh et al. | |
| 2014/0240469 A1* | 8/2014 | Lee | H04N 13/025 348/48 |
| 2014/0251396 A1* | 9/2014 | Subhashrao | A61H 3/061 135/66 |
| 2014/0292508 A1* | 10/2014 | Bhogal | A61H 3/061 340/539.11 |
| 2015/0002808 A1* | 1/2015 | Rizzo, III | A61F 9/08 351/158 |
| 2015/0369623 A1* | 12/2015 | Blumenberg | G01C 21/367 701/532 |
| 2016/0084952 A1* | 3/2016 | Karlapalem | G01S 13/08 342/118 |
| 2016/0209916 A1* | 7/2016 | Sendai | G02B 27/0172 |
| 2016/0227367 A1* | 8/2016 | Alsehly | H04W 4/021 |
| 2016/0275667 A1* | 9/2016 | Modica | G06F 3/0346 |
| 2016/0321955 A1* | 11/2016 | Zhu | G09B 21/007 |
| 2017/0089710 A1* | 3/2017 | Slusar | B60R 1/00 |
| 2017/0148221 A1* | 5/2017 | Lyren | G06T 19/006 |
| 2017/0186315 A1* | 6/2017 | Glasgow | G08G 1/093 |
| 2017/0273552 A1* | 9/2017 | Leung | A61B 3/02 |
| 2017/0307396 A1* | 10/2017 | So | G01C 21/3484 |
| 2017/0318407 A1* | 11/2017 | Meister | H04S 7/303 |
| 2017/0368994 A1* | 12/2017 | Gieseke | B60R 1/00 |
| 2018/0089904 A1* | 3/2018 | Jurgenson | G06T 7/20 |
| 2019/0122381 A1* | 4/2019 | Long | G06T 7/70 |

* cited by examiner

AUGMENTED REALITY ASSISTANCE SYSTEM FOR THE VISUALLY IMPAIRED

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Navigation assistance, such as GPS, has made traveling simple and easy. However, standard navigation systems may not be sufficient for the visually impaired. Navigation systems and techniques for the visually impaired include crowd sourced dependency (e.g., Twitter™) or impractically bulky systems where the user is required to carry an open laptop.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to embodiments of the disclosed subject matter, an augmented reality assistance system can include a wearable augmented reality device. The augmented reality device can include an imaging device, a speaker, a microphone, and one or more sensors. The system can also include a server communicably coupled to the wearable augmented reality device. The server can include processing circuitry configured to receive location information via at least one of the wearable augmented reality device, the one or more sensors, and the microphone, determine amplified location information based on the location information, receive image data from the imaging device, perform a web crawl of the image data, determine a navigation recommendation based on the amplified location information and the web crawl of the image data, and output the amplified location information and the navigation recommendation via the speaker.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
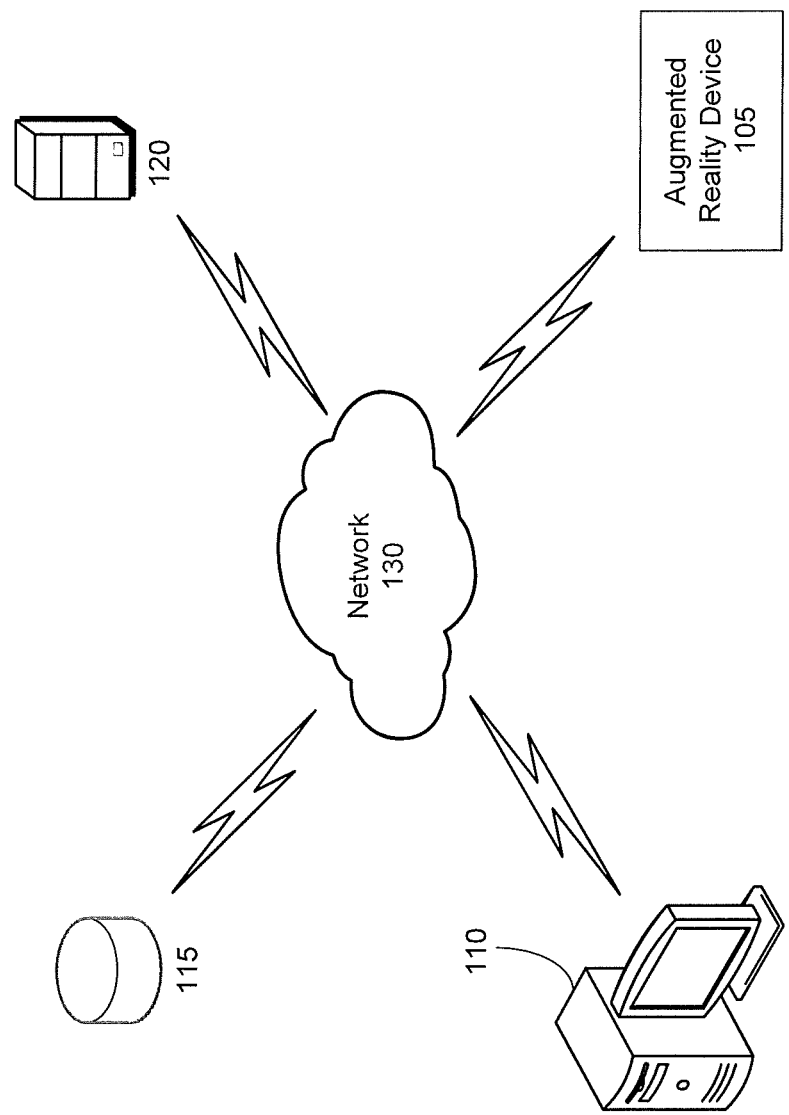
FIG. 1 is an exemplary overview of an augmented reality assistance system for the visually impaired according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 is an exemplary overview of the augmented reality assistance system (herein referred to as the system 100) for the visually impaired according to one or more aspects of the disclosed subject matter. The system 100 can include an augmented reality device 105, a remote device 110, a database 115, a server 120, and a network 130.

The augmented reality device 105 can provide a direct or indirect view of a physical, real-world environment whose elements are augmented and/or supplemented by computer-generated sensory inputs such as sound, video, graphics, GPS data, and the like. The augmented reality device 105 can be a Google Glass™, for example. The augmented reality device 105 can represent one or more augmented reality devices communicably coupled to the remote device 110, the database 115, and the server 120 via the network 130.

The remote device 110 can represent one or more remote devices communicably coupled to the augmented reality device 105, the database 115, and the server 120 via the network 130. The remote device 110 can be a computer, a laptop, a tablet, a smart phone, a PDA, and the like to assist in the operation and/or processing of the system 100.

The database 115 can represent one or more databases communicably coupled to the augmented reality device 105, the remote device 110, and the server 120 via the network 130. The database 115 can store information received from and/or transmitted to one or more of the augmented reality device 105, the remote device 110, and the server 120, for example.

The server 120 can represent one or more servers communicably coupled to the augmented reality device 105, the remote device 110, and the database 115 via the network 130. The server 120 can receive location information from the augmented reality device 105 and transmit amplified location information to the augmented reality device 105, for example. The server 120 can facilitate processing for the system 100 as further described herein.

The network 130 can be a public network, such as the Internet, or a private network such as an LAN or WAN network, or any combination thereof and can also include PSTN or ISDN sub-networks. The network 130 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Generally speaking, the system 100 can allow a visually impaired user (also referred to as the user) to navigate an area via the augmented reality device 105. More specifically, the augmented reality device 105 can communicate with one or more of the remote device 110, the database 115, and the server 120 via the network 130. For example, the server 120 can receive location information including images from the augmented reality device 105, as further described herein, and the server 120 can perform a web crawl to determine amplified location information corresponding to the location of the user. In response, the augmented reality device can output (e.g., via a speaker) the amplified location information determined by the server 120. In another aspect, the augmented reality device 105 can be a stand-alone device to assist the visually impaired user in navigating an area through which the visually impaired user is traversing.

Figure 2:
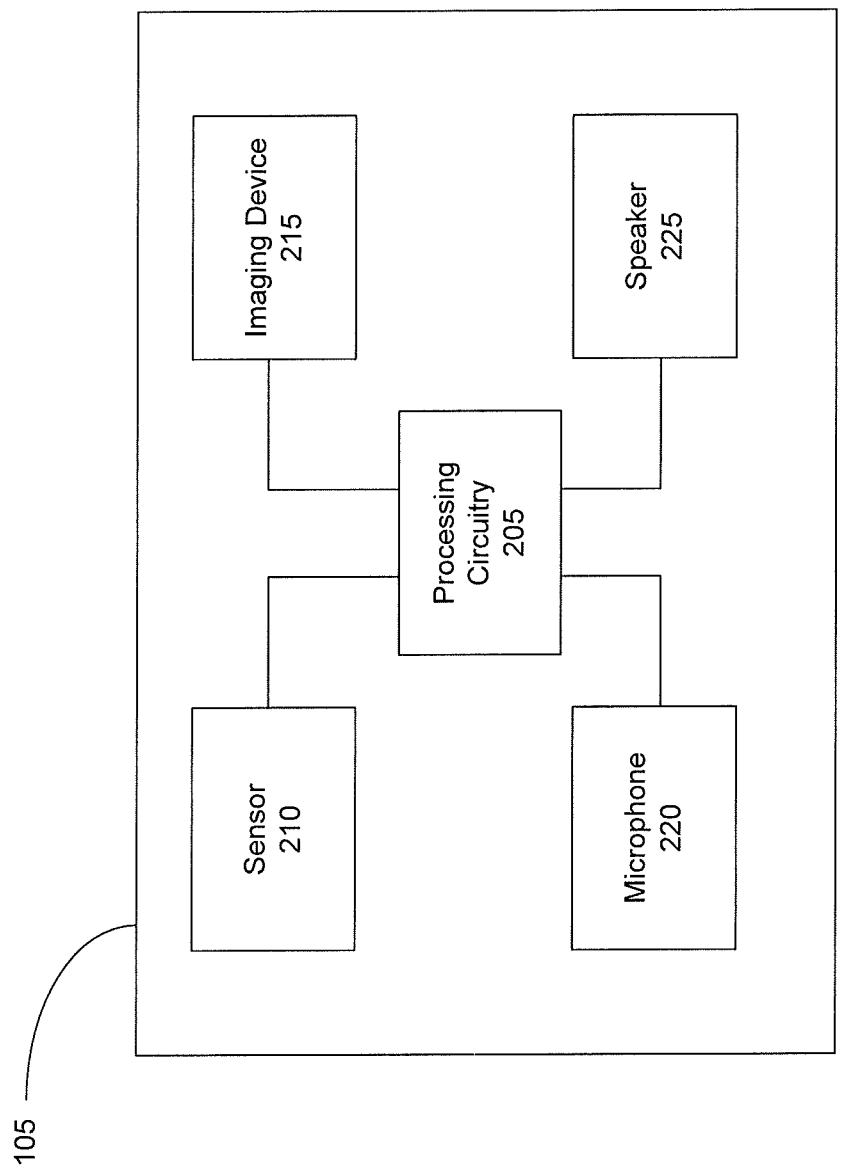
FIG. 2 is a block diagram of an augmented reality device according to one or more aspects of the disclosed subject matter.

FIG. 2 is a block diagram of the augmented reality device 105 according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The augmented reality device 105 can include processing circuitry 205, a sensor 210, an imaging device 215, a microphone 220, and a speaker 225. The aforementioned components can be electrically connected or in electrical communication with each other as diagrammatically represented by FIG. 2, for example.

Generally speaking, the augmented reality device 105 can use the imaging device 215 (e.g., a camera) to determine visual aspects of the environment in which the user is navigating, the microphone 220 to determine sounds from the environment, sensor output from sensor 210, and output information to assist the user in navigation. For example, the augmented reality device 105 can recognize various obstacles by determining that the recognized obstacles match a known obstacle stored in memory in the server 120 or the database 115 (or the augmented reality device 105 in a stand-alone device), for example. Additionally, an unknown obstacle or an unknown section of the area through which the user is navigating can be recognized via a web crawl performed via the remote device 110 or the server 120, for example. The recognized obstacles and areas can be determined via image processing techniques to compare and match images from the imaging device 215 as would be known by one of ordinary skill in the art. Any location information received from one or more of the remote device 110, the database 115, and the server 120 can be output to the user via the speaker 225, for example. In other words, based on various received signals from the imaging device 215, the microphone 220, and the sensor 210, the augmented reality device 105 can output information to assist the user in navigating the environment through which the user is traversing.

The sensor 210 can represent one or more sensors communicably coupled to the augmented reality device 105 to detect motion, orientation, and the like as further described herein. The types of sensors 210 can include a gyroscope, an accelerometer, a positioning system (e.g., GPS), and the like. Multiple same or different sensor types of the foregoing may be implemented.

A gyroscope can be used to monitor the orientation of the augmented reality device 105, for example, to determine if the information detected via the augmented reality device 105 is rotated off a predetermined axis (e.g., vertical). Similarly, the accelerometer can be used to monitor the status of the augmented reality device 105 (e.g., determine the speed and/or stride of the user to output more accurate instructions).

The imaging device 215 can capture images and/or videos of the environment in which the user is navigating.

The microphone 220 can detect noise from the environment in which the user is navigating. For example, the microphone 220 can receive voice commands from the user. The voice commands can be predetermined commands and/or speech detected after a predetermined phrase (e.g., "OK, Google," "Hey, Cortana," etc.). Additionally, the voice commands can access a navigation recommendation, request amplified location information, and the like as further described herein. The microphone 220 can also detect predetermined sounds (e.g., sirens, construction) that may assist the user in navigation. The microphone 220 may also include a voice recognition protocol such that only predetermined voice can communicate with the augmented reality device 105 via the microphone. This may prevent unauthorized or unsolicited commands from sources that have not previously been approved by the user to interact with the augmented reality device 105 via the microphone 220. The microphone 220 can also provide location information based on sounds received from the environment through which the user is navigating.

The speaker 225 can output various instructions, sounds, and the like to assist the user in navigating the user's current environment.

The processor (or processing circuitry) 205 can carry out instructions to perform or cause performance of various functions, operations, steps or processes of the augmented reality device 105. The processor 130 can be configured to store information in memory, operate the augmented reality device 105, control the imaging device 215, the microphone 220, and the speaker 225, receive and send information in the form of signal(s) from the sensor 210, and the like. The processor 130 can also receive and/or send signals from/to one or more of the remote device 110, the database 115, and the server 120 via the network 130.

Figure 3:
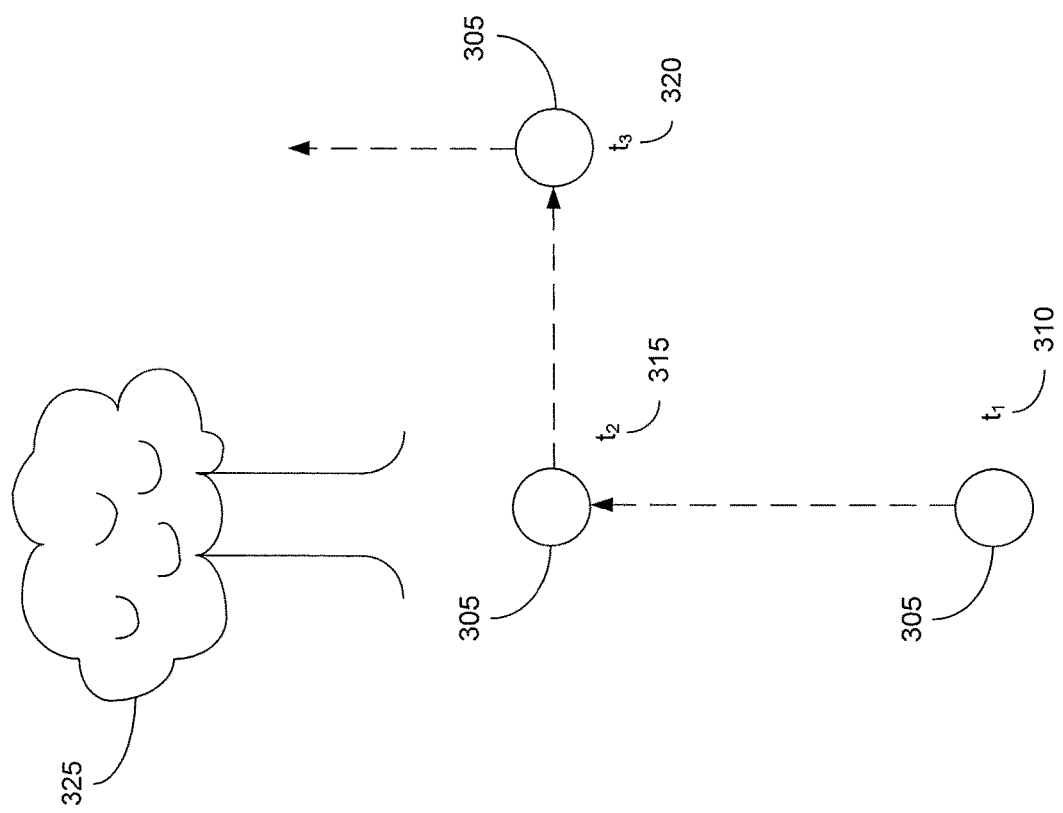
FIG. 3 is an exemplary overview of navigation using the augmented reality system for visually impaired according to one or more aspects of the disclosed subject matter.

FIG. 3 is an exemplary overview of navigation using the system 100 according to one or more aspects of the disclosed subject matter. A user 305 can navigate an environment 300 using the system 100. The user 300 can wear the augmented reality device 105 while traversing the environment by walking, for example. In general, the augmented reality device 105 can output an overview of the navigation recommendation such as "walk around the object ahead" where the object 325 can be a tree, for example. Alternatively, or additionally, at a first time ($t_1$) 310 the augmented reality device can output more specific navigation information. For example, at the first time 310, the speaker 225 can output "walk forward ten steps." The user 305 can then start or continue moving forward the predetermined distance output by the augmented reality device 105. The augmented reality device 105 can estimate the distance covered by the user 305 per one or more steps of the user 305 via the sensor 210 (e.g., accelerometer). For example, the accelerometer can determine the average speed and stride at which the user 305 is walking.

At a second time ($t_1$) 315, the augmented reality device 105 can detect an obstacle 325 in the path of the user 305. The imaging device 215 can detect the obstacle. The obstacle may also be recognized by the augmented reality device 105 via a comparison of the image of the detected obstacle with a known obstacle stored locally in memory or in the database 115, for example, or the obstacle may be recognized as a result of a web crawl performed via the remote device 110 or the server 120, for example. The obstacle 325, now recognized, can be determined to be an obstacle 325 (e.g., a large tree) that the user 305 can pass through or over. Therefore, at the second time 315, the augmented reality device 105 can output navigation instructions via the speaker 225. For example, at the second time 315, the speaker 225 can output "obstacle ahead, walk five steps to your right."

After traveling a sufficient distance based on the navigation instructions output at the second time 315, at a third time 320, the augmented reality device 105 can output further navigation instructions such that the user 305 can walk around the obstacle 325. For example, at the third time 320, the augmented reality device 105 can output, "turn 90 degrees to your left and continue forward."

It should be appreciated that the example discussed is simplified for the sake of explanation.

Figure 4:
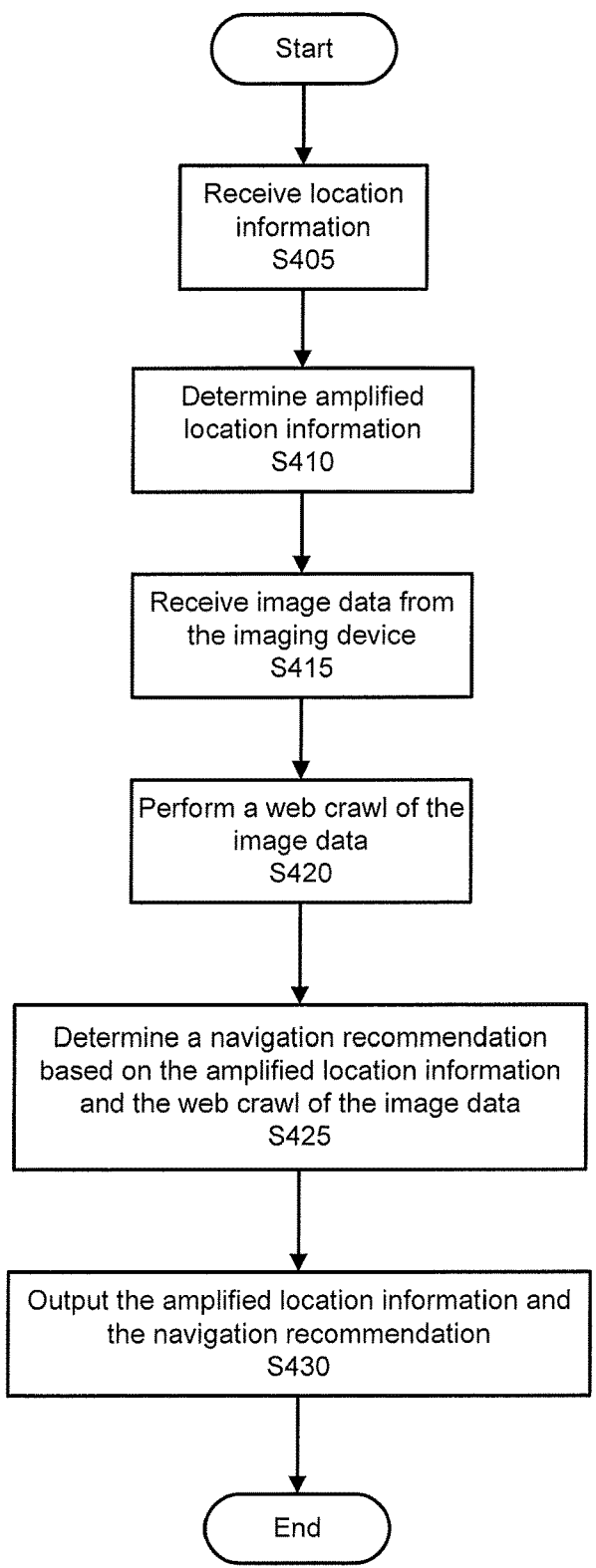
FIG. 4 is an algorithmic flow chart of navigation via the augmented reality system according to one or more aspects of the disclosed subject matter.

FIG. 4 is an algorithmic flow chart of navigation via the augmented reality system 100 according to one or more aspects of the disclosed subject matter.

In S405, the server 120 can receive location information from the augmented reality device 105. For example, the augmented reality device 105 can detect, via one or more sensors, the name of one or more stores in view of the imaging device 215, a prominent land mark (e.g., statue, building, fountain, etc.), various street signs, and the like which can be used as location information. Location information can also include sounds detected via the microphone 220, and the output from the sensor 210. The information detected by the augmented reality device 105 can be transmitted to the server 120. Accordingly, one or more aspects of the environment surrounding the augmented reality device 105 can be received by the server 120 as location information.

In S410, amplified location information can be determined by the server 120. The amplified location information can be a more precise location of the augmented reality device 105, and therefore the user 305. For example, the server 120 can receive the location information detected by the augmented reality device in S405. Based on the received location information, the server 120 can determine amplified location information. For example, if the augmented reality device 105 detects the name of a street on a street sign and the name of a store (e.g., via the name and/or logo), amplified location information can be determined. In general, amplified location information can be determined based on the information detected via the augmented reality device 105 such that a map-like location (e.g., southwest corner of Main St. and $5^{th}$ Ave.), or even more precise GPS coordinates, can be determined based on the objects detected by the augmented reality device 105. More specifically, more precise amplified location information can be determined via various image processing techniques based on the angle at which the objects are detected, the distance of the augmented reality device 105 from the detected objects, and the like as would be known by one of ordinary skill in the art. Additionally, sounds detected from the microphone 215 (e.g., construction noise) and output from the sensor 210 (e.g., angle of view of the augmented reality device 105) can be used to determine amplified location information.

The amplified location information can also be determined at a predetermined time interval (e.g., every 2 seconds). The time interval can be dependent on location. For example, navigating through New York City may determine amplified location information every second. In another aspect, navigating through a small rural town may determine amplified location information every three seconds. Additionally, the predetermined time interval can be based on a predicted number of obstacles within a predetermined distance of the wearable augmented reality device. For example, it could be considered that a higher number of obstacles could be within the predetermined distance from the wearable augmented reality device in a busy city than in a more rural area. In an additional aspect, the predetermined time interval can be more frequent when encountering a more dangerous obstacle.

In S415, image data from the imaging device 215 can be received. The server 120, for example, can receive image data from the imaging device 215 of the augmented reality device 105. Although the image data can be used to assist in updating location information, the image data from imaging device 215 can also provide important information which may affect navigation, especially any objects detected that are new to the environment and/or moving objects (e.g., animals, statues, trees, pedestrians, cars, construction, etc.).

In S420, a web crawl of the image data can be performed to identify objects detected in the image data. For example, the web crawl can include searching for a match of the object in the image data, searching for information corresponding to the object (e.g., dimensions), and the like. Alternatively, or additionally, the web crawl may include social media sites (e.g., Twitter™, Facebook™, etc.) to check for breaking news events and/or general activity in the area, for example. In another aspect, the objects being searched may already be stored in memory (e.g., locally to the augmented reality device 105, in the database 115, the server 120, and/or the remote device 110) and may identify the object detected in the image data without performing a web crawl.

In S425, a navigation recommendation can be determined based on the amplified location information and the web crawl of the image data. In general, the navigation recommendation is determined to safely guide a user in both obstacle-avoidance and navigating to specific locations. For example, the recommendation can include at least one of directional navigation, a verbal description corresponding to the web crawl of the image data, and a warning corresponding to an obstacle in view of the camera. Additionally, the navigation recommendation can also be determined based on user preferences previously input by the user (e.g., allergies, fears, likes, dislikes, etc.) and stored in one or more of locally on the device 105, the server 120, and the database 115. For example, if a user of the augmented reality device 105 is allergic to dogs, the user may wish to avoid interaction with and/or avoid navigating near dogs. The web crawl of the image data can identify that one or more dogs are in the environment of the augmented reality device 105, thereby affecting the navigation recommendation. Additionally, the amplified location information assists in determining the navigation recommendation to safely guide the user away from and/or around the one or more dogs (e.g., navigate around the dog without walking into the street when cars are approaching). It should be appreciated that many scenarios can arise in which the navigation recommendation can be determined based on the amplified location information and/or the web crawl of the image data.

Additionally, the navigation recommendation can assist the user in navigating past obstacles as described in FIG. 3. The obstacles can have a corresponding obstacle classification which can further define the navigation recommendation. For example, an obstacle can be classified as high, medium, and low risk and each classification can have a corresponding navigation recommendation. The classification can be determined manually and input into the system 100 by storing the classifications in the database 115, for example. In one aspect, the classification can be based on the urgency with which the user must navigate past the obstacle. For example, a fire could be considered a high risk obstacle which could correspond to an urgent navigation recommendation. Alternatively, an area of grass with a "Keep Off the Grass" sign may be a low risk obstacle which could correspond in a simple navigation recommendation to avoid stepping on the grass. In another aspect, classifications can be dynamically updated. For example, a type of ground surface may not be considered an obstacle when the surface is dry. However, the same type of ground surface may be slick in the rain and/or snow, thereby making the ground surface an obstacle. Therefore, the system 100 can receive local weather reports based on location as input and update the classifications for various obstacles accordingly. In an additional aspect, obstacles can also be classified as moving or static which may affect the navigation recommendation. For example, a static vehicle may be an obstacle to navigate around, whereas a moving vehicle may be very dangerous and any navigation recommendation should not place the user in the path of the moving vehicle. As another example, an obstacle can be classified as sharp and may require additional caution on the part of the user. For example, a piece of lumber full of nails can be classified as sharp and the navigation recommendation may include additional instructions on avoiding the obstacle.

In S430, the amplified location information and the navigation recommendation can be output via the speaker 225 to provide the user of the augmented reality device 105 with the amplified location information and the navigation recommendation. The amplified location information and the navigation recommendation can be automatically output at a predetermined interval of time, automatically output in response to various events, and/or manually output when a command is received via the microphone 220. The predetermined interval of time for outputting the amplified location information and the navigation recommendation can be determined by the server 120 on location. For example, in urban areas, such as a busy city, the updates may be performed more frequently (e.g., every second), and a less populated rural area may have updates less frequently (e.g., every 3 seconds). Additionally, amplified location information and the navigation recommendation may be output based on changes in the environment through which the user is navigating. For example, the server can output additional navigation instructions when the server 120 determines that the user may encounter the obstacle before the time interval expires based on a current path of the obstacle and/or the user. Further, the amplified location information and/or the navigation recommendation can be output based on location, the type of obstacle and/or object detected, the user's position relative to the obstacle and/or object detected, a danger associated with the obstacle and/or object, and the like. Further, the server 120 may be able to determine trends of obstacles for a given location. For example, the given location may be busier during rush hours (e.g., from 6:00 AM to 10:00 AM in the morning, and from 4:00 PM to 8:00 PM in the evening). Additionally, the given location may have tourist attractions which could correspond to an increase in obstacles for a portion of the year when an increased number of tourists visit (e.g., spring and summer). In another aspect, the given location may become permanently more busy, which can correspond to an increased number of obstacles, based on popularity and a resulting growth and/or influx of people to the given location. The server 120 can store observed obstacle data in the database 115, for example, which can be collected from one or more of the augmented reality device 105 and update the predetermined interval of time for which the navigation recommendation is output accordingly. The predetermined interval of time can also be determined based on the classification of obstacles that are frequently observed in the given area. For example, if many obstacles classified as high risk are frequently observed in the given area, the predetermined interval of time may be decreased.

Figure 5:
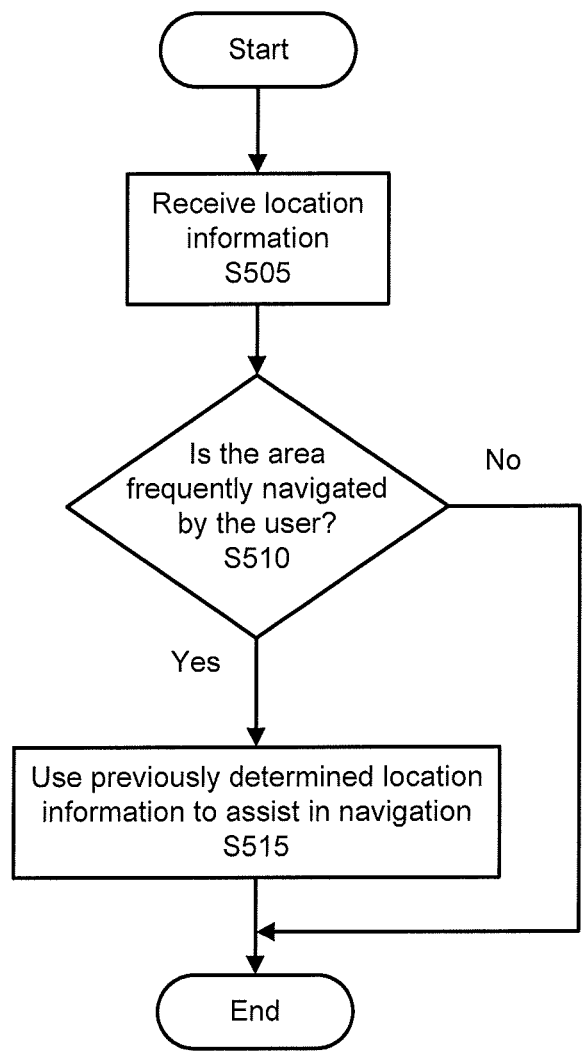
FIG. 5 is an algorithmic flow chart of navigation via the augmented reality system in a frequently navigated area according to one or more aspects of the disclosed subject matter.

FIG. 5 is an algorithmic flow chart of navigation via the augmented reality system in a frequently navigated area according to one or more aspects of the disclosed subject matter.

In S505, location information can be received. For example, the server 120 can receive location information from the augmented reality device 105.

In S510, it can be determined if the area is frequently navigated by the user of the augmented reality device 105. The frequency with which an area is navigated by a user can be determined based on information input by the user including common locations (e.g., location of home, location of work, location of grocery store, etc.) and routes to and from those locations. Additionally, it can be determined if the area is frequently navigated by comparing location information and/or amplified location information with any stored information and/or observed information, for example. The stored information being images, location, and the like stored in one or more of local memory, the remote device 110, the server 120, and the database 115. If the user frequently takes the same path to work, it can be determined that the areas through which the user is navigating are frequently navigated. For example, a "home" location and a "work" location can be stored and when accessed, it can be determined that the path the user will take from home to work and from work to home may be frequently navigated. Additionally, an area that has been observed more than a predetermined number of times (i.e., exceeds a predetermined threshold) in a predetermined time interval may automatically be considered a frequently navigated area. For example, if the user navigates to the same location ten or more times in one month, the area to which the user is traveling and/or the path to the location may be considered frequently navigated areas. Further, the risk classification of an obstacle may be updated based on the frequently navigated areas. For example, a static obstacle that may be classified as high risk in an area that is not frequently navigated can be classified as medium or low risk in a frequently navigated area. An example may be a path adjacent to a steep hill with no railing which may be high risk in an unfamiliar area, but may be considered lower risk in a frequently navigated area as the system 100 and the user may be more familiar with how to navigated the path, for example.

Additionally, if the area is frequently navigated by the user, the amplified location information and/or the navigation recommendations may be output less frequently as the user becomes more familiar with the area (e.g., every two seconds rather than every second). For example, if the user passes and/or sits at the same park bench frequently in the frequently navigated area, the user may be familiar with the location of the park bench, thereby reducing the frequency with which the system 100 needs to output information relating to the park bench. If the area is not frequently navigated by the user of the augmented reality device 105, then the process can end. However, if the area is frequently navigated by the user of the augmented reality device 105, then previously determined location information can be used to assist in navigation in S515.

In S515, previously determined location information can be used to assist in navigation. For example, if the user of the augmented reality device 105 frequently takes a route (e.g., to work), then many of the obstacles may be known and can be stored (e.g., in database 115, locally in memory, etc.) for quicker access. Additionally, much of the location information may already be known, such as the street names, the stores along the route, any permanent obstacles that need to be navigated around, and the like. In other words, the previously determined location information can be conveniently stored and accessed more quickly, which may reduce the time and need for a web crawl of known image data, for example, ultimately providing more efficient processing. Additionally, as the augmented reality device 105 becomes more familiar with the environment of a frequently navigated route, the amplified location information and the navigation recommendation can become more precise, resulting in a better user experience and safer navigation. After previously determined location information is used to assist in navigation in S515, the process can end. In another aspect, previously stored images can be compared to current images to detect differences.

It should be appreciated to those skilled in the art in light of this disclosure that, while the various steps of FIG. 4 and FIG. 5 are shown according to a particular order for ease of explanation, that certain steps may be performed in different orders or in parallel.

An advantage of the system 100 can be that it is adaptable to scenarios as they occur. For example, construction may not be scheduled or appropriately communicated to the public. By being able to detect construction with one or more of the imaging device 215 and the microphone 220 in real time, navigation through the environment can be improved.

The system 100 provides an opportunity to the user for navigating more precisely and efficiently. This technology vastly improves upon previous solutions such as guide dogs. Further, the system 100 vastly improves upon current navigation systems and techniques for the visually impaired which include crowd sourced dependency (e.g., Twitter™) or impractically bulky systems where the user is required to carry an open laptop. Therefore, the technical solution to the technical problem of adequately providing real-time navigation instructions to a person wearing an augmented reality device in order to effectively avoid obstacles which solves a variety of problems is described herein.

Additionally, the system 100 can determine navigation recommendations based on user preferences. For example, a user of the augmented reality device may prefer avoiding dogs, and the navigation recommendation can be determined to avoid any dogs detected via one or more of the imaging device 215 and/or the microphone 220.

Further, the system 100 may be very helpful in navigation scenarios including the supermarket or the airport, for example. The system 100 may assist a user in navigating the super market, as well as determining which items to select based on a shopping list by comparing image data with the shopping list. Additionally, navigating an airport may be improved by comparing the image data to the user's ticket information to assist in navigating through the airport to the user's gate, as well as navigating through busy terminals.

Figure 6:
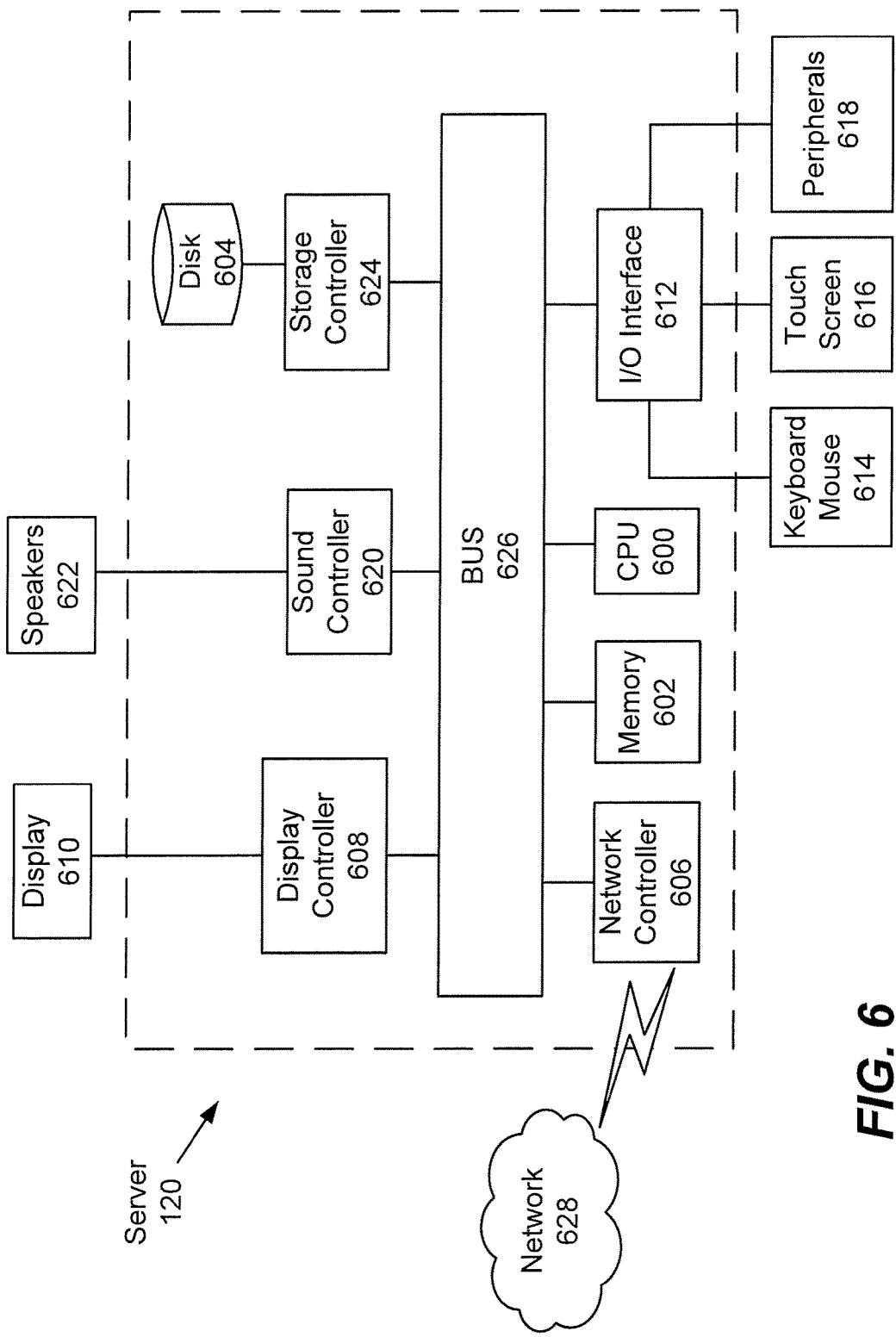
FIG. 6 is a hardware block diagram of a server according to one or more exemplary aspects of the disclosed subject matter.

FIG. 6 is a hardware block diagram of a server according to one or more exemplary aspects of the disclosed subject matter.

Next, a hardware description of the server 120 according to exemplary embodiments is described with reference to FIG. 6. In FIG. 6, the server 120 includes a CPU 600 which performs the processes described above/below. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 120 communicates, such as a server or computer.

Further, the claimed advancements may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

The hardware elements in order to achieve the server 120 may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The server 120 in FIG. 6 also includes a network controller 606, such as an Intel Ethernet PRO network interface card from Intel Corporation of America, for interfacing with network 628. As can be appreciated, the network 628 can be a public network, such as the Internet, or a private network such as an LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 120 further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the server 120, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the server 120. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An augmented reality assistance system, comprising:
    a wearable augmented reality device including:
        an imaging device configured to capture image data of an environment surrounding the wearable augmented reality device,
        a speaker configured to output audio commands including at least one of amplified location information,
        a microphone configured to detect audio data including at least one of verbal commands or sounds from the environment surrounding the wearable augmented reality device, and
        one or more additional sensors configured to detect one or more types of additional sensor data associated with the environment surrounding the wearable augmented reality device; and
    a server communicably coupled to the wearable augmented reality device, the server including processing circuitry configured to:
        receive location information from the wearable augmented reality device including at least one of the image data, the audio data or the additional sensor data,
        determine amplified location information corresponding to the environment surrounding the wearable augmented reality device based on the received location information indicating a position of the wearable augmented reality device,
        detect one or more objects in the image data corresponding to one or more obstacles based on a web crawl of the image data,
        determine a navigation recommendation based on the amplified location information and the web crawl of the image data, the navigation information providing avoidance information of the one or more obstacles, and
        output the amplified location information and the navigation recommendation via the speaker of the wearable augmented reality device, wherein the processing circuitry is configured to determine the amplified location information at a predetermined interval of time based on detected, sensed, or identified obstacles within a predetermined distance of the wearable augmented reality device; and wherein the processing circuitry is configured to determine one or more trends in observed obstacles, the one or more trends being based on a predetermined number of times the obstacle is observed within a predetermined amount of time, and update the predetermined interval of time based on the one or more trends.

2. The system of claim 1, wherein the navigation recommendation includes at least one of directional navigation, a verbal description corresponding to the web crawl of the image data, or a warning corresponding to an obstacle in view of the imaging device.

3. The system of claim 2, wherein the processing circuitry is configured to determine the navigation recommendation at least in part based on user preferences.

4. The system of claim 1, wherein the processing circuitry is configured to automatically output at least one of the amplified location information or the navigation recommendation at a predetermined interval of time or manually output at least one of the amplified location information or the navigation recommendation in response to receiving a command at the microphone.

5. The system of claim 1, wherein the processing circuitry outputs at least one additional navigation recommendation when an obstacle is detected before the predetermined interval of time expires.

6. The system of claim 5, wherein the processing circuitry is configured to classify the obstacle as moving or static and update the navigation recommendation based on the classification of the obstacle.

7. The system of claim 1, wherein the processing circuitry is further configured to determine if an area through which the augmented reality device is navigating is frequently navigated by the augmented reality device based on a comparison of the amplified location information to stored image data.

8. The system of claim 7, wherein the processing circuitry is further configured to determine the navigation recommendation based on the comparison.

9. The system of claim 7, wherein the processing circuitry is configured to update a risk classification of an obstacle when the obstacle is encountered in the frequently navigated area.

10. A method of navigation via the augmented reality system, comprising:

receiving location information from a wearable augmented reality device including at least one of image data, audio data or additional sensor data;

determining, via processing circuitry, amplified location information corresponding to an environment surrounding the wearable augmented reality device based on the received location information indicating a position of the wearable augmented reality device;

detecting one or more objects in the image data corresponding to one or more obstacles based on a web crawl of the image data;

determining, via processing circuitry, a navigation recommendation based on the amplified location information and the web crawl of the image data, the navigation information providing avoidance information of the one or more obstacles;

outputting the amplified location information and the navigation recommendation via a speaker of the wearable augmented reality device;

determining the amplified location information at a predetermined interval of time based on detected, sensed, or identified obstacles within a predetermined distance of the wearable augmented reality device;

determining one or more trends in observed obstacles, the one or more trends being based on a predetermined number of times the obstacle is observed within a predetermined amount of time; and updating the predetermined interval of time based on the one or more trends.

11. The method of claim 10, wherein the navigation recommendation includes at least one of directional navigation, a verbal description corresponding to the web crawl of the image data, and a warning corresponding to an obstacle in view of an imaging device coupled to the wearable augmented reality device.

12. The method of claim 10, further comprising:

automatically outputting at least one of the amplified location information or the navigation recommendation at a predetermined interval of time or manually outputting at least one of the amplified location information or the navigation recommendation in response to receiving a command at the microphone.

13. The method of claim 10, further comprising:

outputting at least one additional navigation recommendation when an obstacle is detected before the predetermined interval of time expires.

14. The method of claim 13, further comprising:

classifying the obstacle as moving or static and update the navigation recommendation based on the classification of the obstacle.

15. The method of claim 10, further comprising:

determining if an area through which the augmented reality device is navigating is frequently navigated by the augmented reality device based on observations of an area that has been observed more than a predetermined number of times in a predetermined time interval.

* * * * *